United States Patent
Krause et al.

(10) Patent No.: US 6,560,513 B2
(45) Date of Patent: May 6, 2003

(54) ROBOTIC SYSTEM WITH TEACH PENDANT

(75) Inventors: Kenneth W. Krause, Rochester Hills, MI (US); Donald D. DeMotte, Lake Orion, MI (US); Claude A. Dinsmoor, Rochester Hills, MI (US); Judy A. Evans, Oakland, MI (US); Glenn F. Nowak, Trenton, MI (US); Gerald A. Ross, Lindent, MI (US); Gary J. Rutledge, Clarkston, MI (US); Charles F. Slabe, Orion, MI (US)

(73) Assignee: Fanuc Robotics North America, Rochester Hills, MI (US)

( * ) Notice: Subject to any disclaimer, the term of this patent is extended or adjusted under 35 U.S.C. 154(b) by 0 days.

(21) Appl. No.: 09/855,421

(22) Filed: May 15, 2001

(65) Prior Publication Data

US 2002/0045970 A1 Apr. 18, 2002

Related U.S. Application Data

(63) Continuation-in-part of application No. 09/443,789, filed on Nov. 19, 1999.

(51) Int. Cl.[7] .......................... G05B 15/00; G05B 19/00
(52) U.S. Cl. ..................... 700/264; 700/245; 700/249; 700/258; 700/259; 700/260; 318/568.11; 318/568.12; 318/568.13; 318/568.22; 318/568.24; 219/124.34; 701/23
(58) Field of Search .............................. 700/250, 165, 700/173, 192, 200, 245, 249, 257, 258, 259, 260, 178, 180, 164, 264, 247; 318/568.12, 568.2, 568.22, 563, 568.11, 568.13, 568.24; 219/124.34, 125.1; 901/15, 41, 3, 14, 16, 42; 701/23

(56) References Cited

U.S. PATENT DOCUMENTS

| | | | | | |
|---|---|---|---|---|---|
| 4,403,281 A | * | 9/1983 | Holmes et al. | ......... | 318/568.18 |
| 4,432,063 A | * | 2/1984 | Resnick | ....................... | 700/250 |
| 4,433,382 A | * | 2/1984 | Cunningham et al. | . | 318/568.12 |
| 4,453,221 A | * | 6/1984 | Davis et al. | ................... | 706/13 |

(List continued on next page.)

FOREIGN PATENT DOCUMENTS

| | | | |
|---|---|---|---|
| DE | 29823119 | | 4/1999 |
| EP | 0 792 726 A1 | * | 9/1997 |
| EP | 0838768 | | 4/1998 |
| EP | 0992867 | | 4/2000 |
| JP | 07100649 A | * | 4/1995 |
| JP | 410071592 A | * | 3/1998 |
| JP | 411292285 A | * | 10/1999 |
| WO | WO97/10931 | * | 9/1995 |

OTHER PUBLICATIONS

Nakamura et al., Multimedia communication pendant for sensor–based robtic task teaching by sharing information—Modular structure and application to sensign systems—, IEEE, pp. 1166–1171.*

*Primary Examiner*—William A. Cuchlinski, Jr.
*Assistant Examiner*—McDieunel Marc
(74) *Attorney, Agent, or Firm*—Howard & Howard

(57) ABSTRACT

A robotic system for a robot includes a programmable controller coupled to the robot and a teach pendant coupled to the programmable controller. The teach pendant is adapted to control the robot and includes a processor capable of operating the teach pendant and a display coupled to the processor. The teach pendant also includes a web browser. The web browser is adapted to accept input data in a standard format and display the input data on the display.

103 Claims, 6 Drawing Sheets

U.S. PATENT DOCUMENTS

| | | | | | |
|---|---|---|---|---|---|
| 4,506,335 | A | * | 3/1985 | Magnuson | 340/436 |
| 4,538,233 | A | * | 8/1985 | Resnick et al. | 700/189 |
| 4,663,726 | A | * | 5/1987 | Chand et al. | 700/259 |
| 4,675,502 | A | * | 6/1987 | Haefner et al. | 219/124.34 |
| 4,680,519 | A | * | 7/1987 | Chand et al. | 318/568.19 |
| 4,685,067 | A | * | 8/1987 | French et al. | 318/568.13 |
| 4,896,274 | A | * | 1/1990 | Hohn et al. | 700/250 |
| 4,959,523 | A | * | 9/1990 | Fihey et al. | 219/124.34 |
| 5,014,183 | A | * | 5/1991 | Carpenter et al. | 318/568.19 |
| 5,025,393 | A | * | 6/1991 | Naito | 700/264 |
| 5,103,403 | A | | 4/1992 | Ch'Hayder et al. | 700/263 |
| 5,373,221 | A | | 12/1994 | McGee et al. | 318/568.11 |
| 5,495,410 | A | * | 2/1996 | Graf | 318/568.11 |
| 5,705,906 | A | | 1/1998 | Tanabe et al. | 318/568.13 |
| 5,706,502 | A | | 1/1998 | Foley et al. | 707/10 |
| 5,715,918 | A | * | 2/1998 | Everett et al. | 192/48.92 |
| 5,742,762 | A | | 4/1998 | Scholl et al. | 709/200 |
| 5,805,442 | A | | 9/1998 | Crater et al. | 700/9 |
| 5,857,206 | A | | 1/1999 | Tsutsumitake | 707/203 |
| 5,862,330 | A | | 1/1999 | Anupam et al. | 709/204 |
| 5,878,218 | A | | 3/1999 | Maddalozzo, Jr. et al. | 709/213 |
| 6,151,625 | A | | 11/2000 | Swales et al. | 709/218 |
| 6,175,206 | B1 | | 1/2001 | Ueno et al. | 318/568.1 |
| 6,201,996 | B1 | | 3/2001 | Crater et al. | 700/9 |
| 6,208,948 | B1 | | 3/2001 | Klinger et al. | 702/183 1998, |

OTHER PUBLICATIONS

Ang Jr. et al., A walk-throught programmed robot for welding in shipyards, 1999, Internet, pp. 1–22.*

Fanuc Robotics, Arc tool application software, 2000, Internet, pp. 1–4.*

FANUC i Pendant, A new robot teach pendant with internet interface, 1997–2000, p. 1.*

ACS, Automation components, systems and services, no date, Internet, pp. 1–4.*

Epson Robots, Robots and Controllers, note date, Internet, 1–8.*

ABB Automation, Stamp World: the complete solution for press automation, no date, Internet, 1–8.*

Husky, Hylectric Machines, 2001, Internet pp. 1–20.*

Safarie et al., Telerobotics experiments via internet, 1997, pp. 1–18.*

Sprow, PC–Based controls: Part 3, Retrofit revolution, 1999, Internet, pp. 1–6.*

Brantmark et al., Man/machine communication in ASEA's new robot controller, 1982, ASEA Journal vol. 55, No. 6.*

Advanced manufacturing, Design is the fundamemtal soul of a man–made creation, 2001, Internet, pp. 1–44.*

Burdea, Invited review the synergy between virtual reality and robotics, 1999, Internet/IEEE, pp. 400–410.*

Echoscan Inc, MB500 pneumatic robotics module, no date, Internet, pp. 1–3.*

RWT Articles, The key to using robots:2001, Internet, pp. 1–4.*

Calkin et al., Visualisation, simulation & control of a robotic system using internet technology, no date, Internet, pp. 1–6.*

JCD Robotics, External view of the robot, no date, Internet, pp. 1–2.*

JCD Robotics, Motoman K6SB, no date, Internet, p. 1.*

Chen et al., Remote supervisory control of an autonomous mobile robot via world wide web, 1997, Internet/IEEE, pp. ss60–3364.*

U.S. patent application, US 202/0147528 A1 Watanabe et al. entitled "Robot Information Processing System" (Mar. 2, 2002) Apr. 2, 2002.

Notification of Transmittal Of The International Search Report or the Declaration; International Application No. PCT/US 00/31350; International filing date Nov. 15, 2000.

PCT International Search Report—International Application No. PCT/US 00/31350; International Filing Date Nov. 15, 2000.

Functionality Overview of an Open Source Embedded Web Server by GoAhead Software, Inc. May 1999.

* cited by examiner

ROBOTIC SYSTEM WITH TEACH PENDANT

This application is a continuation-in-part application of U.S. patent application Ser. No. 09/443,789 filed Nov. 19, 1999 entitled "Method And System For Allowing A Programmable Controller To Communicate With A Remote Computer."

FIELD OF THE INVENTION

The present invention relates generally to robotic systems, and more particularly, to a robot teach pendant having a processor in communication with a robot controller.

BACKGROUND OF THE INVENTION

Programmable controllers operate elaborate industrial equipment, such as robots, in accordance with a plurality of stored control programs. When executed, each program causes the programmable controller or robot controller to examine the state of the controlled machinery by evaluating signals from one or more sensing devices (e.g., position encoders, temperature sensors, or pressure sensors) and to operate the machinery (e.g., by controlling the output voltage for servo motors, or energizing/de-energizing discrete components) based on a procedural framework, the sensor signals and, if necessary, more complex processing.

The programmable controller is generally described as a computer-based control unit that is represented by an aggregate of conventional elements, including a central processing unit, a crystal controlled clock, random access memory, communication channels, digital and analog input/output ports and D/A and A/D converter channels. The control unit also supports a user interface, which may include a teach pendant and/or display device, to facilitate operator input of processing programs, commanded positions, and system parameters.

A wide variety of data is displayed on the teach pendent to provide necessary and important information for the operator. A problem encountered with communicating a wide variety of data objects or data items to a teach pendant is that the pendent must contain programs to properly display all the different forms of data appropriate to the situation in which they must be displayed. This requires extensive programming and program storage for the teach pendent which must be as light and inexpensive as possible. Similarly, remote computers must have programming to support the display of data from the robot controller. This can mean that special interface programs must be added to each computer that is to receive and display data from the robot controller.

One known method and system to overcome this problem is disclosed in U.S. Pat. No. 5,805,442 to Crater et al, entitled "Distributed Interface Architecture For Programmable Industrial Control Systems." Crater et al. shifts the burden of providing user interfaces for changing forms of data from the remote computer to the controllers. This is accomplished by combining data with functionality for displaying that data at the individual controllers. Each of the controllers has a computer memory for storing the relevant data and formatting instructions, i.e., web pages, associated with the data that allow a properly equipped remote computer to display the data in a predetermined format. Thus, each type of data has a web page associated with it stored in the controller's memory. However, this adds complexity and increased memory capacity to the programmable controller.

The information available on the controller is expanding and the systems are becoming more complex. A user typically wants to get information from a second controller but cannot access the information without physically moving to the second controller. As the information becomes more complex, typical black and white screens are of little use to the operator to distinguish critical problems from warnings. Drawings and reference material to aid in solving a problem are in a graphical format and cannot be displayed on the current teach pendants.

The present invention is aimed at one or more of the problems identified above.

SUMMARY OF THE INVENTION

In one aspect of the present invention, a teach pendant coupled to a robot controller having a robot, is provided. The teach pendant includes a processor capable of operating the teach pendant and the I/O devices on the teach pendant. The teach pendant further includes a web browser adapted to accept input data in a standard format and display the input data on the display.

In another aspect of the present invention, a robotic system for a robot is provided. The system includes a robot controller coupled to the robot and a teach pendant coupled to the robot controller. The teach pendant is adapted to control the robot and includes a processor capable of operating the teach pendant and the I/O devices on the teach pendant. The teach pendant also includes a web browser adapted to accept input data in a standard format and display the input data on the display.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
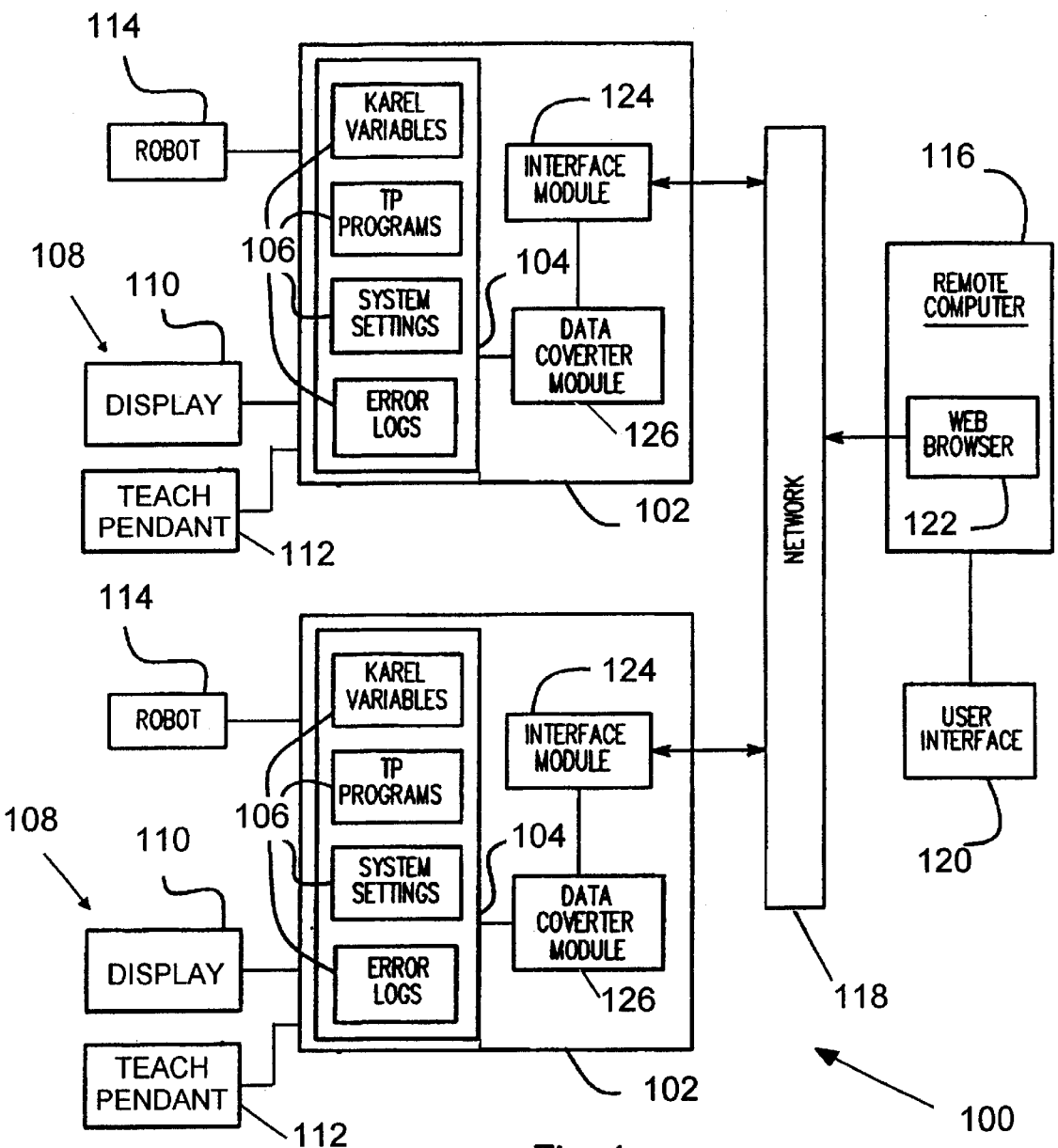
FIG. 1 is a schematic view of a system incorporating the present invention.

FIG. 1 shows a system 100 incorporating the present invention. The system 100 includes at least one programmable controller 102 having a memory 104 for storing a plurality of types of data objects 106. The memory 104 may be a CMOS (Complementary Metal Oxide Semiconductor), a DRAM (Dynamic Random Access Memory), a FROM (Flash Read Only Memory), or any other suitable memory or combination thereof. The types of data objects 106 include, but are not limited to, system variables, user program variables, user TP programs, error logs, system settings, 10 configuration and current states, and KAREL variables, where KAREL is a programming language that is a practical blend of logical, English-like features of high level languages, such as Pascal and PL/1, and the proven factory-floor effectiveness of machine control languages. These types of data objects 106 are written in different formats as well as by different programming languages. For example, the format is different for the error logs, the system variables and the user TP programs. The KAREL variables are written by a language different from the TP user programs as well as stored in different formats. Thus, therein lies the difficulty in easily accessing and reading the data stored in the controller 102.

The programmable controller 102 may include a user interface 108 for allowing a user to enter data or programs into the controller 102 or for accessing the data stored therein. The user interface 108 may include a display 110 for displaying the information to the user and a teach pendant 112.

The programmable controller 102 may be a robot controller, wherein in such a case, the controller 102 is coupled to a robot 114 for actively performing a variety of tasks. However, the present invention is not limited to robot controllers. The programmable controller 102 may be a passive controller, such as a monitoring device that monitors predetermined conditions.

To assist in monitoring operation of the programmable controller 102, at least one remote computer 116 is coupled to the programmable controller 102 preferably via a functional network 118. The remote computer 116 may be located in the same room or building as the programmable controller 102, or it may be located in an entirely different building, which may or may not be located in the same geographic vicinity as the controller 102. The network 118 may be a local area network of controllers communicating via, for example, via a Ethernet and TCP/IP communication protocols, or a direct link to the Internet.

Coupled to the remote computer 116 is a second user interface 120, which may include a keyboard, mouse, and/or display, for entering information regarding the desired data to be accessed. The remote computer 116 also includes a network facilitator 122, in communication with the user interface 120 and the network 118, for facilitating data interchange with the programmable controller 102. The network facilitator 122 may be any conventional web browser for locating, fetching or receiving, and displaying requested information, wherein displaying can range from simple pictorial and textual rendering to real-time playing of audio and/or video segments or alarms, mechanical indications, printing, or storage of data for subsequent retrieval and display.

The programmable controller 102 includes an interface module 124 coupled to the network 118 for receiving requests for data from the remote computer 116. The interface module 124 is then coupled to a data converter module 126, which is in communication with memory 104, for processing the request. The data converter module 126 determines the object type of the data being requested and converts it accordingly into a comprehensible format. The data is typically stored in some form of binary format and the data converter module 126 converts it into a comprehensible format that is readable by the user of the remote computer 116 such as, text, graphics, audio, or tabular format.

Upon conversion of the data, the interface module 124 dynamically generates a user display for transmission to the remote computer 116 via the network 118. The user display is then displayed to the user at the remote computer user interface 120 so that the user can read the data. In generating the user display, the interface module 124 generates instructions on how to display the requested data and then combines these newly created instructions with the comprehensible format of the data. These include instructions for displaying the text either textually and/or graphically or any other format or combination of formats. Preferably, the instructions are HTML (Hypertext Markup Language) codes that are added to the converted data at the time of the request for data. Other standards that could be used on the teach pendent (but not restricted to) are FLASH, VMRL, XML, FTP, and Telnet.

Figure 2:
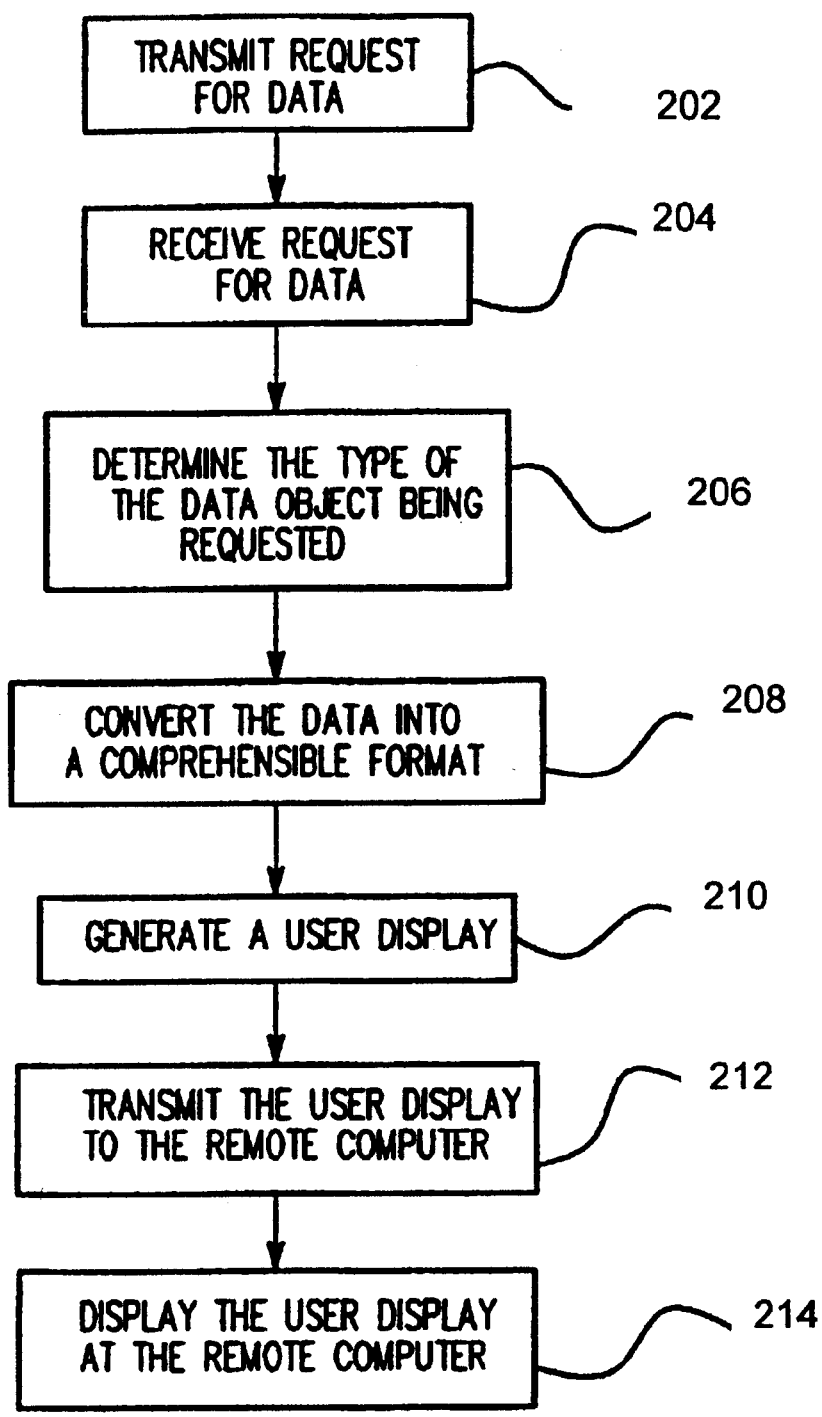
FIG. 2 is a flow chart illustrating the general sequence of steps associated with the method of the present invention.

FIG. 2 is a flow diagram illustrating the general steps associated with the operation of the present invention. At a first process block 202, the user transmits a request for data from the remote computer to initiate operation of the interface module 124. The interface module 124 is initiated remotely by a logical connection from the web browser 122 to the interface module 124 utilizing a standard protocol. In order to insure proper routing of messages between the remote computer 116 and the controller 102, the messages are first broken up into data packets, each of which receives a destination address according to a consistent protocol, and which are reassembled upon receipt by interface module 124. A commonly accepted set of protocols for this purpose are the Internet Protocol, or IP, which dictates routing information and the transmission control protocol, or TCP, according to which messages are actually broken up into IP packets for transmission for subsequent collection and reassembly. TCP/IP connections are quite commonly employed to move data across telephone lines and local/wide area networks.

The Internet supports a large variety of information-transfer protocols, including the World Wide Web, or web. Web-accessible information is identified by a uniform resource locator or "URL," which specifies the location of the file in terms of a specific computer. Typically, a URL has the format "http://host>/<path>", where "http" refers to the HyperText Transfer Protocol, "host" is the server's Internet identifier, and the "path" specifies the location of the file within the server. In the present invention, the general URL syntax to access various files on the programmable controller 102 may is preferably in the form of "http://<robot>[/device]/<filename>, where "robot" is the name or IP address of the robot controller 102, "device" is optional reference to physical devices on the controller 102, and "filename" is the actual file to retrieve. Thus, when the interface module 124 recognizes a URL directed to its corresponding controller 102, the message/request is accepted, as shown in a second process block 204.

The data converter module 126 then determines the object type of the data being requested and converts the data accordingly into a comprehensible format, as shown at third and fourth process blocks 206, 208, respectively. The data converter module 126 locates the requested data in memory and determines the type of the data object so that it knows how to access the data. Then, a conversion is performed from the original format of the data into a comprehensible format.

Figure 3:
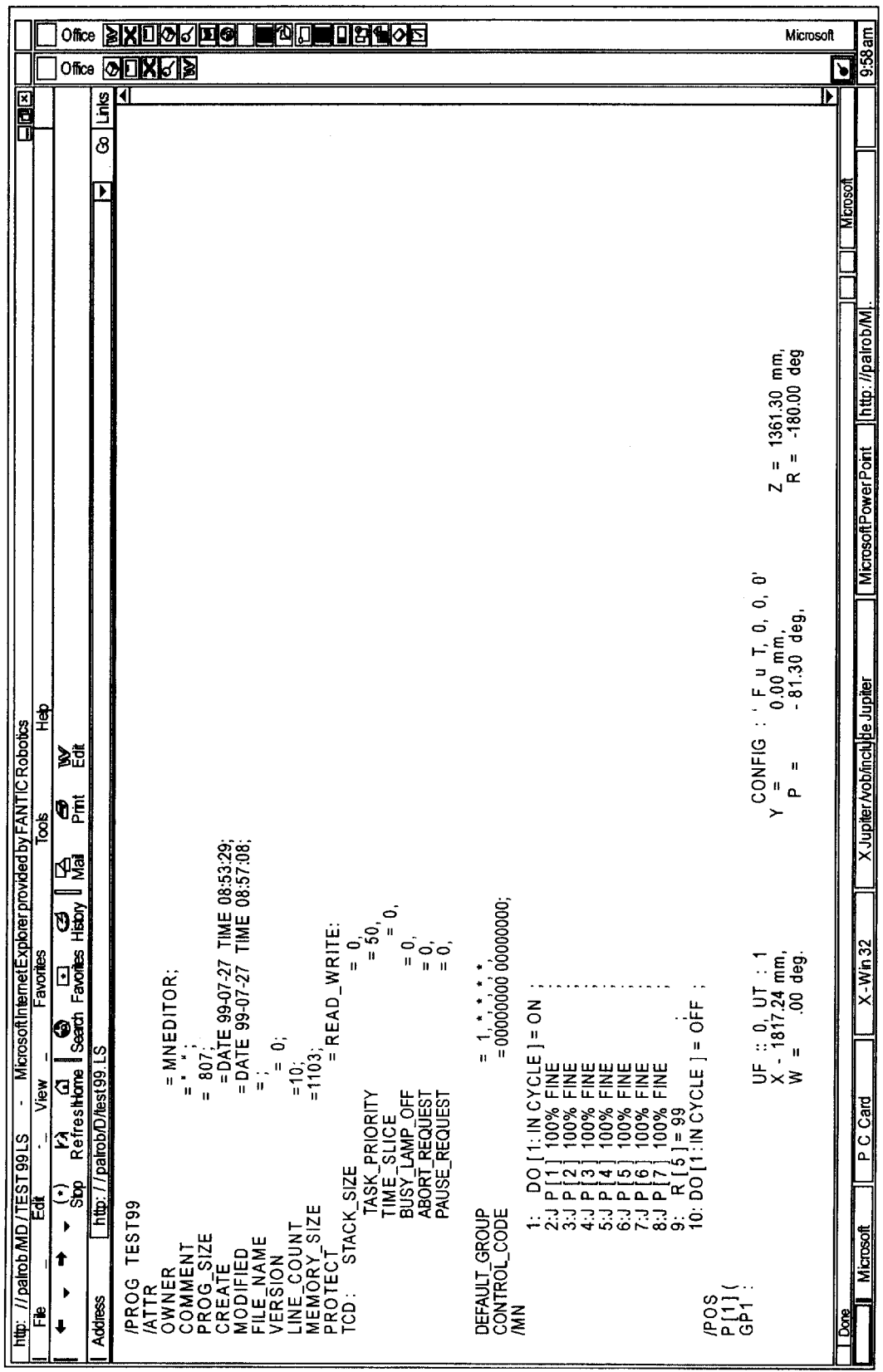
FIG. 3 is an example of a formatted user display generated by the programmable controller of the present invention.

Next, interface module 124 creates the instructions on how to display the converted data and combines these instructions with the data itself to create a graphical user display or graphical user interface 300 for interaction with a user, as shown at a fifth process block 210. This user display 300 may be in the form of a web page, as shown in FIG. 3, in which case the instructions are created utilizing Hyper- Text Markup Language (HTML) codes. HTML breaks the document into syntactic portions, such as headings, paragraphs, lists, etc., that specify layout and contents. An HTML file can contain elements such as text, graphics, tables and buttons, each identified by a "tag".

Figure 4:
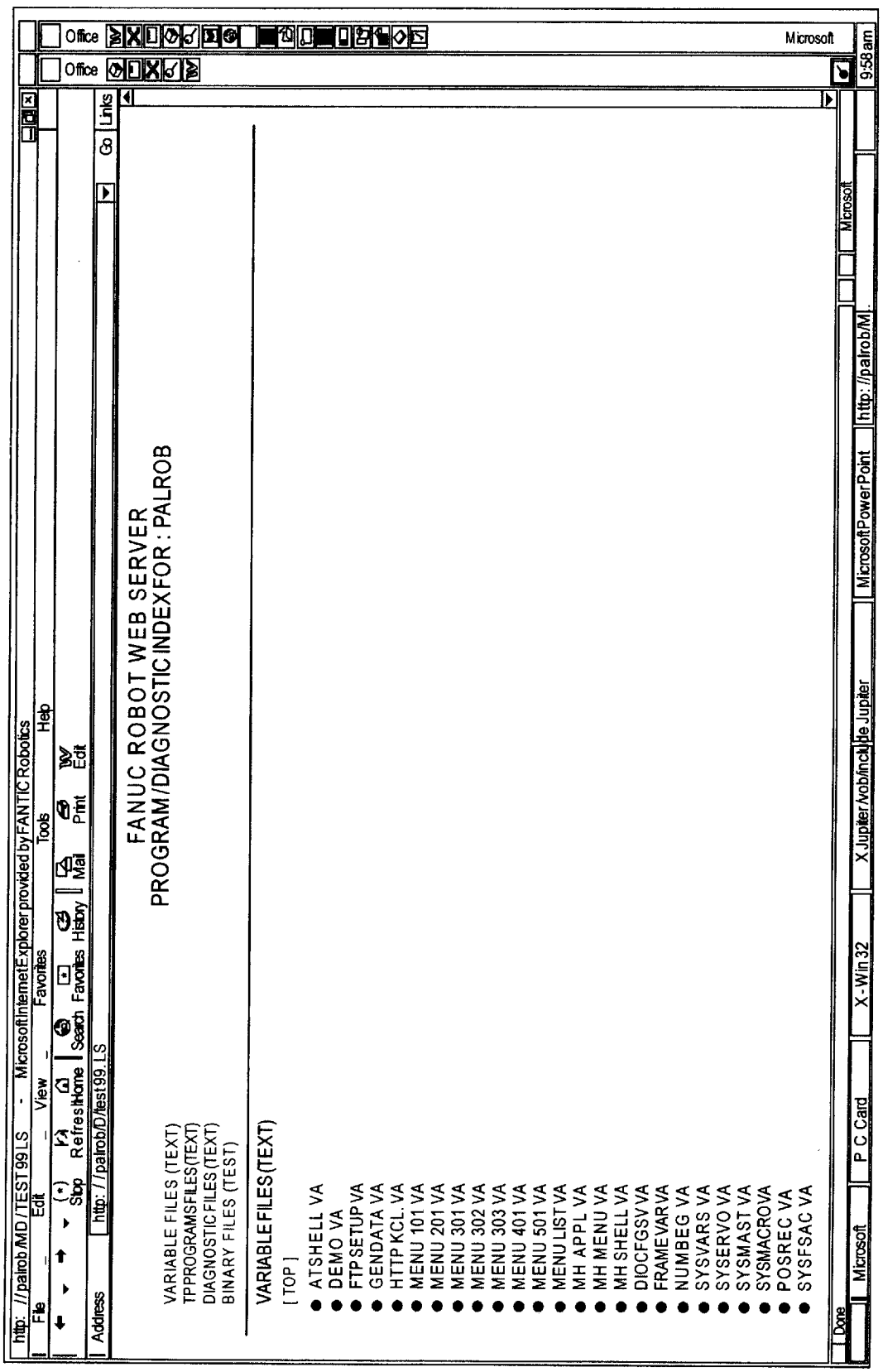
FIG. 4 is an example of a user display illustrating different possible data objects associated with a particular file.

As can be seen in FIG. 4, the requested data may have sub-data related thereto. For example, if the user requested a list of programs or data objects resident on the programmable controller 102, then the interface module 124 generates a user display containing the list of the data object types and a link to each data object. Thus, the user can then select a specific data object to display.

The user display is transmitted to the remote computer 116 in a sixth process block 212 for receipt by network facilitator, or web browser, 122. The web browser 122 then locates, fetches and displays resources, executes hyperlinks and applications (e.g., an applet or plug-in), and generally interprets web page information in order to display the user display to the user, as shown in a seventh process block 214. The application may also be used to exchange and format data. The application may be written in any suitable programming or scripting language, such as Java, Javascript, or ActiveX. The web browser 122 may be any of the numerous available web browsers, e.g., NETSCAPE NAVIGATOR (supplied by Netscape Communications Corp.), INTERNET EXPLORER (supplied by Microsoft Corp.), or MOSAIC (different versions of which are available free of charge at a variety of web sites).

Thus, real-time data resident on the controller 102 is readily available to a user. And, an inexperienced user may access the controller 102 utilizing existing web products to obtain basic information contained in the controller 102. For example, a maintenance engineer can answer a troubleshooting call by accessing the controller 102 and looking at the error log from his desk. Or a production foreman may access a custom screen and determine the production counts for the day.

Figure 5:
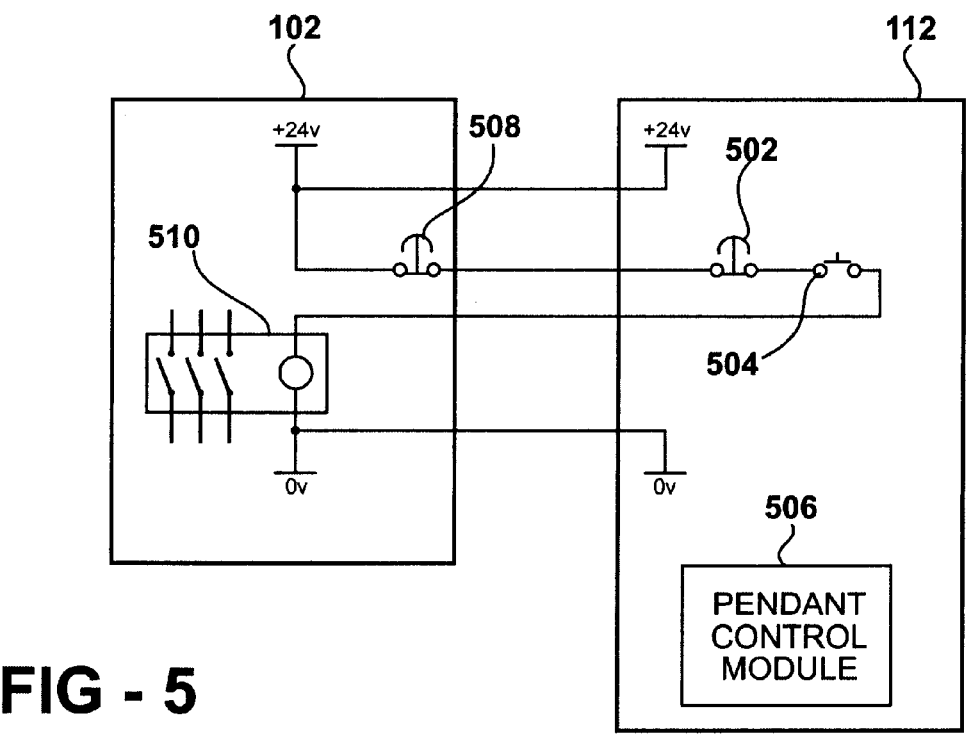
FIG. 5 is a block diagram of a teach pendant having a pendant control module and a programmable controller, according to an embodiment of the present invention.
Figure 6:
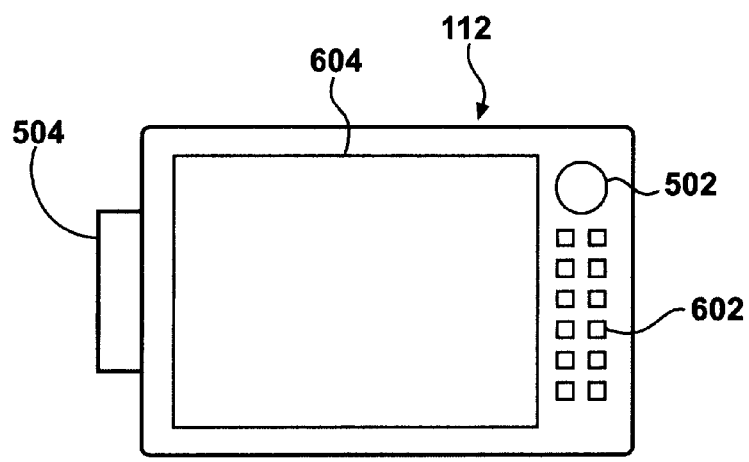
FIG. 6 is a diagrammatic illustration of the teach pendant of FIG. 5.
Figure 7:
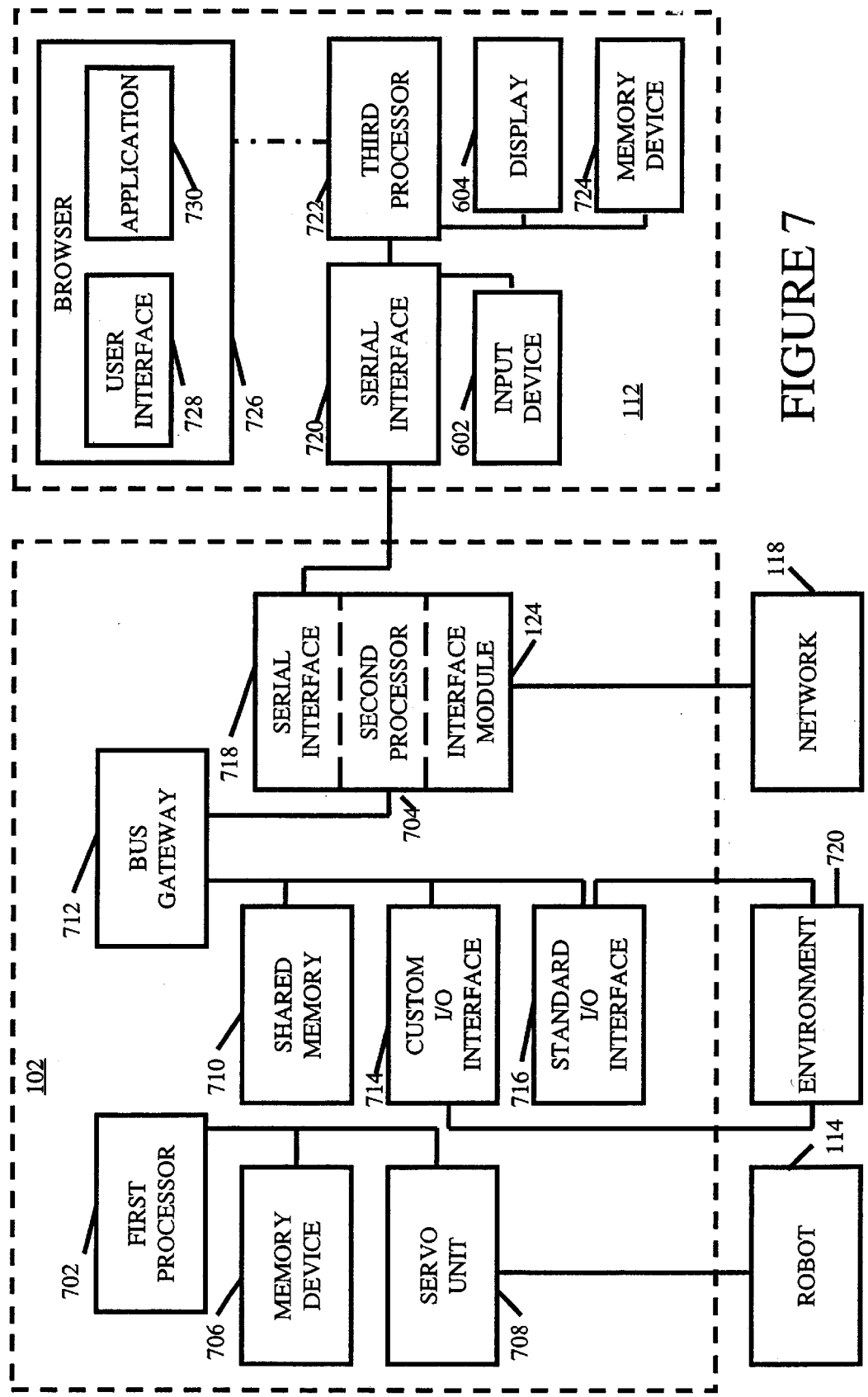
FIG. 7 is a block diagram of the pendant control module of FIG. 5.

With reference to FIGS. 5–7, a teach pendant 112 according to an embodiment of the present invention is illustrated. The teach pendant 112 includes an emergency stop switch 502 and a deadman switch 504 which are needed to secure the safety of an operator.

The teach pendant 112 also includes a teach pendant control module 506 which provides communication with the robot controller 102, visual feedback to the operator and a means for inputting data (see below). The teach pendant 112 is also adapted to teach points in a planned robot or motion path to the robot controller 102.

The robot controller 102 includes an emergency stop switch 508 and an emergency stop contactor 510. The emergency stop switch 508 is electrically connected to the emergency stop switch 502 and the deadman switch 504 on the teach pendant 112 and the exciting coil of the emergency contactor 510 in series therewith. Each contact of the emergency stop contactor 510 is connected to the power of a servoamplifier (not shown) for controlling the servomotor of each axis of the robot main body. When operation for depressing the deadman switch 504 is stopped, or when any of the emergency stop switches 502, 508 is depressed while the deadman switch 502 is depressed, power to the servoamplifier is forcibly interrupted. Further, the robot controller 102 may have a power supply line connected to the teach pendant 112 to supply electric power for operating the pendant control module 506. The safety devices distinguish the teach pendant from a normal operator panel and are dictated by various government regulatory bodies for use with robots.

The teach pendant 112 is located near and tethered either directly or by radio or other electromagnetic communications to the robot controller 102. The teach pendant 112 may be used to create a program for the robot 114 and displaying a state of the robot 114. Further, the teach pendant 112 includes functions necessary for robot teaching operations and for safety purposes.

With specific reference to FIG. 6, the teach pendant 112 includes an input device 602, such as a keyboard or plurality of input buttons, mouse, touchpad, touch screen, rollerball, or any suitable input device and a display 604. Preferably, the display 604 includes a liquid crystal display screen. The display 604 may also be a touch screen.

The display 604 is mounted on the teach pendant 112. The display unit 604 can display a large amount of information including not only character information, but also graphic information in an easy to see fashion. The surface of the liquid crystal display unit 604 is preferably covered with a transparent touch panel as an input unit on a screen. The emergency stop switch 502 is disposed on the front panel or outer surfaces of the teach pendant 112. The deadman switch 504 is disposed on a side or back of the teach pendant 123.

With specific reference to FIG. 7, in one embodiment, the robot controller 102 includes a first processor 702 and a second processor 704. The second processor 704 is linked to the interface module 124 to facilitate communication to other devices, e.g., other robot controllers 102, connected on the network 118.

The robot controller 102 serves as the main processor for the robot 114. The first processor 702 is preferably a central processing unit or CPU running a proprietary operating system. The first processor 702 is connected to a memory device 706 for program and data storage. The first processor 702 is also coupled to a servo control unit 708 for controlling individual servomotors (not shown) of the robot 114. The first processor 702 also receives robot position status information from the servo control unit 708.

The second processor 704, preferably a central processing unit, is also operated using a proprietary operating system designed for communications management. The second processor 704 accesses a shared memory 710 via a bus gateway 712. Communication takes place in two forms: (1) I/O which give specific state or command information to other devices or processors through either a custom I/O interface 714 or a standard I/O interface 716; and (2) communication through a serial communications interface 718 or the interface module 124. The I/O outputs from the custom I/O interface 714 or from the standard I/O interface 716 are part of real-time communication between the robot 114 and the environment 720 within which the robot 114 operates. Communications through the serial communications interface 126 and the network interface 128 (to an Ethernet network 130) are communications with other intelligent devices or processors. The functions of the second processor may also be performed by the first processor, if the second processor is not present.

The teach pendant 112 includes a third processor 720 capable of operating the teach pendant and the I/O devices on the teach pendant. The second processor 704 is connected to the third processor 720 of the teach pendant 112 by a serial communications interface 722. The third processor 720 is, preferably, a commercially available microprocessor designed for embedded applications running a proprietary operating system which is preferably optimized for size, performance, reliability, and stability. The third processor 720 is preferably connected to the input device 602, a memory device 724, and the display 604. Programs and data used for the operation of the teach pendant 112 are stored in the memory device 724. An operator enters commands on the input device 602 which are then transmitted to the first processor 702. The first processor 702 then controls the robot 114 through the servo control unit 708 in accordance with the entered commands.

The memory device 724 is used to store programs and data for the operation of the teach pendant 112. The display 604 is used to display information regarding the status and position of the robot 114 which are transmitted from the first processor 702 to the third processor 720. Position and status information may be displayed in a numerical value format or may be displayed visually, i.e., with a graphic representation of the robot 114.

The system 100 uses client server technology coupled with hypertext markup language (HTML) and a specialized or custom web browser 726 running on the third processor 720 to display robot information on the teach pendant 114. The web browser 726 is adapted to accept input data in a standard format and display the input data on the display via a user interface 728 (see below).

The teach pendant 112 is coupled to the interface module 124 on the robot controller 124 through the serial interface module 718 or the network interface 118. The interface module 124 is adapted to receive requests for data from the teach pendant 112. The data converter module 126, which is in communication with the interface module 124, processes the request. The data converter module 126 determines the object type of the data being requested and converts it accordingly into a comprehensible format. The data is typically stored in some form of binary format and the data converter module 126 converts it into a comprehensible format that is viewed or received by the user of the teach pendant 112 such as, text, graphics, audio, or tabular format.

Upon conversion of the data, the interface module 124 dynamically generates the user interface 728 for transmission to the teach pendant 112. The user interface 728 is then displayed to the user at the teach pendant 112 so that the user can read the data. In generating the user interface 728, the interface module 124 generates instructions on how to display the requested data and then combines these newly created instructions with the comprehensible format of the data. These include instructions for displaying the text either textually and/or graphically or any other format or combination of formats. Preferably, the instructions are HTML (Hypertext Markup Language) codes that are added to the converted data at the time of the request for data.

The operator can enter a request for data with the input device 602 using the user interface 728 displayed via the custom browser 726 running on the third processor 720. The browser 726 makes a request for a file with the specific data requested by the operator from a server program running on the first processor 702. The server program obtains the required data and formats the data into a display page of the user interface 728, preferably in HTML. The display page, which may invoke an application 730 (i.e., an applet or plug-in) to display the requested data (or for any other requested functions), is transmitted from the first processor 702 to the third processor 720 for display on the display 604. The application may either received by the teach pendant 112 with the display page or resident on the teach pendant 112.

In general, the user interface 728 allows the operator to view the programs that are available to be executed on the controller 102. The user may select a program from the list of available programs, e.g., operating programs or utilities, and instruct the robot controller to execute the selected program through the teach pendant 112.

In one embodiment, the teach pendent 112 acts as the client and is adapted to display the display page containing data received from a server. The server may be the robot controller 102 connected to the teach pendant 112, another robot controller 102 coupled to the teach pendant 112 through the network 118, or the remote computer 116. The user may request additional data to display on the display 604 through the user interface 728.

The additional display data may include an image, audio or visual. In one embodiment, the image is live, i.e., captured and displayed in real-time. In another embodiment, the image is captured and displayed at a delayed time. The image may also be a series of images representing a real-time operation of the robot controller 102 (or the robot 114).

Visual images might come from a vision system (not shown) and include either pictures of past occurrences or a live presentation of what the vision system is observing. The user of the teach pendent 112 may also be shown a live picture of the disassembly of a component for training purposes. Audio information could include instructions on how to accomplish a task transferred from a remote location. Audio information could also be used to warn the user that he is jogging the 114 robot toward a virtual limit surface which prevents the robot 114 from damaging product or tooling.

The operator or user of the teach pendant 112 may request operation of a program on the robot controller 102 via an application in the display page of the user interface 728.

The application 730 contained within the user interface 728 may also request a transfer of a program or data file between one of the robot controllers 102 (either through the direct link or the network 118) and the teach pendant 114 or between the teach pendant 114 and the remote computer 116. The application 730 may also present the user interface 728 or portions thereof. Examples of data files (or data streams) include:

- a list of positions of the robot 114 for selection of a particular position to edit;
- a list of process variables, e.g., pressure of sealant being dispensed or current in an arc welding system; and,
- a stream of data representing process variables or process states transferred to the teach pendent 112 to present a virtual strip chart so the operator can observe the performance of process variables relative to each other.

The user of the teach pendant 112 may also request data files, such as, a diagram from an operator's manual stored on a documentation server, e.g., the remote computer 116. The teach pendent 112 allows the user to edit data and/or program files received from the robot controller 102 and/or the remote computer 116 through an application in the user interface 728.

Additionally, as shown in FIG. 1, the teach pendant 112 is coupled to the other robot controllers 102 through the network 118. The network 118 is used to facilitate communication between the robot controllers 102, a teach pendant 112 coupled to one of the robot controllers 102 and another robot controller 102, and the teach pendent 112 and the remote computer 116. Thus, the teach pendant 112 connected to each robot controller 102 is adapted to accept remote input data from the other robot controller 102 and display the remote input data on its display 604.

Within the capability of the browser 728 is the ability to send and receive email. Thus, the robot controller 728 having detected a condition of the system 100, e.g., a maintenance condition, could transfer data about the condition to the teach pendent 112. An applet would then generate an email to the maintenance department concerning the issue. That email would be sent by the email capability on the teach pendent 112 either by itself or through the controller 112.

Preferred embodiments have been disclosed. However, a worker skilled in this art would recognize that modifications would come within the scope of this invention. Thus, the following claims should be studied to determine the scope and content of this invention.

What is claimed is:

1. A teach pendant coupled to a programmable controller having a robot, comprising:
   a processor for operating the teach pendant;
   a display coupled to the processor; and
   a web browser running on the teach pendant for accepting input data in a standard format and for displaying the input data on the display,
   wherein the teach pendant is to act as a client and is to display a display page that is composed of data and instructions on how to display the data.

2. A teach pendant, as set forth in claim 1, wherein the teach pendant is to act as a client and the programmable controller is to act as a server.

3. A teach pendant, as set forth in claim 2, wherein the programmable controller is to compose a display page in response to a request for data from the teach pendant and to transmit the display page to the teach pendant and wherein the teach pendant is to display the display page on the display.

4. A teach pendant, as set forth in claim 1, wherein the teach pendant is to teach points in a path of the robot.

5. A teach pendant, as set forth in claim 1, wherein the display page invokes an application.

6. A teach pendant, as set forth in claim 5, wherein the application creates and sends an email message.

7. A teach pendant, as set forth in claim 5, wherein the application is to request additional display data from the programmable controller.

8. A teach pendant, as set forth in claim 7, wherein the additional display data is displayed on the display.

9. A teach pendant, as set forth in claim 7, wherein the additional display data represents a visual image.

10. A teach pendant, as set forth in claim 7, wherein the additional display data represents audio information.

11. A teach pendant, as set forth in claim 1, wherein the web browser is to display a user interface for interaction with a user.

12. A teach pendant, as set forth in claim 11, wherein the user interface invokes an application.

13. A robotic system for a robot, comprising:
   a programmable controller coupled to the robot; and
   a teach pendant coupled to the programmable controller to control the robot, the teach pendant including:
      a processor for operating the teach pendant;
      a display coupled to the processor; and
      a web browser running on the teach pendant for accepting input data in a standard format and for displaying the input data on the display, p1 the robotic control system acting as a server and the teach pendant acting as a client in communication with the server, wherein the server composes a display page in response to a request for data from the client and transmits the display page to the client, and the client displays the display page which is composed of data and instructions on how to display the requested data.

14. A robotic system, as set forth in claim 13, wherein the teach pendant is to teach points in a path of the robot.

15. A robotic system, as set forth in claim 13, wherein the display page invokes an application.

16. A robotic system, as set forth in claim 15, wherein the application is to request additional display data from the programmable controller.

17. A robotic system, as set forth in claim 16, wherein the additional display data represents a visual image.

18. A robotic system, as set forth in claim 16, wherein the additional display data represents audio information.

19. A robotic system, as set forth in claim 13, wherein the web browser is to display a user interface.

20. A robotic system, as set forth in claim 19, wherein the user interface invokes an application.

21. A robotic system, as set forth in claim 20, wherein the application is to request a transfer of a data file between the programmable controller and the teach pendant.

22. A robotic system, as set forth in claim 19, including:
   a second programmable controller; and,
   a network coupled between the programmable controller and the second programmable controller for facilitating communication between the programmable controllers.

23. A robotic system, as set forth in claim 22, wherein the teach pendant is to accept remote input data from the second programmable controller and display the remote input data on the display.

24. A robotic system for a robot, comprising:
   a programmable controller coupled to the robot to act as a server;
   a teach pendant coupled to the programmable controller to control the robot and to act as a client, the teach pendant including:
      a processor for operating the teach pendant;
      a display coupled to the processor;
      a web browser running on the teach pendant for accepting input data in a standard format and display the input data on the display;
   wherein the teach pendant is to display a user interface for interaction with a user on the display and to generate and deliver to the server a data request in response to a request from the user, and wherein the server is to generate a display page in response to the data request for display by the client on the display.

25. A teach pendant coupled to a programmable controller having a robot, comprising:
   a processor for operating the teach pendant;
   a display coupled to the processor; and
   a web browser running on the teach pendant for accepting input data in a standard format and for displaying the input data on the display,
   wherein the web browser is to display a user interface for interaction with a user and wherein the user interface invokes an application for requesting additional display data from the programmable controller in response to a request from the user.

26. A teach pendant, as set forth in claim 25, wherein the teach pendant is to act as a client and the programmable controller is to act as a server.

27. A teach pendant, as set forth in claim 26, wherein the programmable controller is to compose a display page in response to a request for data from the teach pendant and to transmit the display page to the teach pendant and wherein the teach pendant is to display the display page on the display.

28. A teach pendant, as set forth in claim 25, wherein the teach pendant is to teach points in a path of the robot.

29. A teach pendant, as set forth in claim 25, wherein the teach pendant is to act as a client and is adapted to display a display page.

30. A teach pendant, as set forth in claim 29, wherein the display page is composed of data and instructions on how to display the requested data.

31. A teach pendant, as set forth in claim 30, wherein the display page invokes an application.

32. A teach pendant, as set forth in claim 31, wherein the application creates and sends an email message.

33. A teach pendant, as set forth in claim 31, wherein the application is to request additional display data from the programmable controller.

34. A teach pendant, as set forth in claim 33, wherein the additional display data is displayed on the display.

35. A teach pendant, as set forth in claim 33, wherein the additional display data represents a visual image.

36. A teach pendant, as set forth in claim 33, wherein the additional display data represents audio information.

37. A teach pendant coupled to a programmable controller having a robot, comprising:
a processor for operating the teach pendant;
a display coupled to the processor; and
a web browser running on the teach pendant for accepting input data in a standard format and for displaying the input data on the display,
wherein the web browser is to display a user interface for interaction with a user and wherein the user interface invokes an application for requesting a transfer of a data file between the programmable controller, the teach pendant, and a remote computer coupled to the programmable controller.

38. A teach pendant, as set forth in claim 37, wherein the teach pendant is to act as a client and the programmable controller is to act as a server.

39. A teach pendant, as set forth in claim 38, wherein the programmable controller is to compose a display page in response to a request for data from the teach pendant and to transmit the display page to the teach pendant and wherein the teach pendant is to display the display page on the display.

40. A teach pendant, as set forth in claim 37, wherein the teach pendant is to teach points in a path of the robot.

41. A teach pendant, as set forth in claim 37, wherein the teach pendant is to act as a client and is adapted to display a display page.

42. A teach pendant, as set forth in claim 41, wherein the display page is composed of data and instructions on how to display the requested data.

43. A teach pendant, as set forth in claim 42, wherein the display page invokes an application.

44. A teach pendant, as set forth in claim 43, wherein the application creates and sends an email message.

45. A teach pendant, as set forth in claim 43, wherein the application is to request additional display data from the programmable controller.

46. A teach pendant, as set forth in claim 45, wherein the additional display data is displayed on the display.

47. A teach pendant, as set forth in claim 45, wherein the additional display data represents a visual image.

48. A teach pendant, as set forth in claim 45, wherein the additional display data represents audio information.

49. A robotic system for a robot, comprising:
a programmable controller coupled to the robot; and
a teach pendant coupled to the programmable controller to control the robot, the teach pendant including:
a processor for operating the teach pendant;
a display coupled to the processor; and
a web browser running on the teach pendant for accepting input data in a standard format and for displaying the input data on the display,
wherein the web browser is to display a user interface for interaction with a user and wherein the user interface invokes an application for requesting additional display data from the programmable controller in response to a request from the user.

50. A robotic system for a robot, comprising:
a programmable controller coupled to the robot; and
a teach pendant coupled to the programmable controller to control the robot, the teach pendant including:
a processor for operating the teach pendant;
a display coupled to the processor; and
a web browser running on the teach pendant for accepting input data in a standard format and for displaying the input data on the display,
wherein the web browser is to display a user interface for interaction with a user and wherein the user interface invokes an application for requesting operation of a program on the programmable controller in response to a request by a user.

51. A robotic system for a robot, comprising:
a programmable controller coupled to the robot; and
a teach pendant coupled to the programmable controller to control the robot, the teach pendant including:
a processor for operating the teach pendant;
a display coupled to the processor; and
a web browser running on the teach pendant for accepting input data in a standard format and for displaying the input data on the display,
wherein the web browser is to display a user interface for interaction with a user and wherein the user interface invokes an application for requesting a transfer of a data file between the programmable controller, the teach pendant, and a remote computer coupled to the programmable controller.

52. A robotic system for a robot, comprising:
a programmable controller coupled to the robot;
a teach pendant coupled to the programmable controller to control the robot, the teach pendant including:
a processor for operating the teach pendant;
a display coupled to the processor; and
a web browser running on the teach pendant for accepting input data in a standard format and for displaying the input data on the display, wherein the web browser is to display a user interface for interaction with a user;
a second programmable controller; and
a network coupled between the programmable controller and the second programmable controller for facilitating communication between the programmable controllers.

53. A robotic system, as set forth in claim 52, wherein the teach pendant is to accept remote input data from the second programmable controller and display the remote input data on the display.

54. A teach pendant coupled to a programmable controller having a robot, comprising:
   a processor for operating the teach pendant;
   a display coupled to the processor; and
   a web browser running on the teach pendant for accepting input data in a standard format and for displaying the input data on the display.

55. A teach pendant, as set forth in claim 54, wherein the teach pendant is to act as a client and the programmable controller is to act as a server.

56. A teach pendant, as set forth in claim 55, wherein the programmable controller is to compose a display page in response to a request for data from the teach pendant and to transmit the display page to the teach pendant and wherein the teach pendant is to display the display page on the display.

57. A teach pendant, as set forth in claim 54, wherein the teach pendant is to teach points in a path of the robot.

58. A teach pendant, as set forth in claim 54, wherein the teach pendant is to act as a client and is adapted to display a display page.

59. A teach pendant, as set forth in claim 58, wherein the display page is composed of data and instructions on how to display the requested data.

60. A teach pendant, as set forth in claim 59, wherein the display page invokes an application.

61. A teach pendant, as set forth in claim 60, wherein the application is part of the display page.

62. A teach pendant, as set forth in claim 60, wherein the application is resident on the teach pendant.

63. A teach pendant, as set forth in claim 60, wherein the application is composed in Java.

64. A teach pendant, as set forth in claim 60, wherein the application is composed using Javascript.

65. A teach pendant, as set forth in claim 60, wherein the application is composed using ActiveX.

66. A teach pendant, as set forth in claim 60, wherein the application is composed using a native programming language.

67. A teach pendant, as set forth in claim 60, wherein the application creates and sends an email message.

68. A teach pendant, as set forth in claim 60, wherein the application is to request additional display data from the programmable controller.

69. A teach pendant, as set forth in claim 68, wherein the additional display data is displayed on the display.

70. A teach pendant, as set forth in claim 68, wherein the additional display data represents a visual image.

71. A teach pendant, as set forth in claim 70, wherein the visual image is a live image.

72. A teach pendant, as set forth in claim 70, wherein the visual image is a captured image.

73. A teach pendant, as set forth in claim 70, wherein the visual image is a series of images representing a real-time operation of the programmable controller.

74. A teach pendant, as set forth in claim 73, wherein the additional display data represents audio information.

75. A teach pendant, as set forth in claim 74, wherein the audio information is a live stream of information.

76. A teach pendant, as set forth in claim 74, wherein the audio information is a pre-recorded stream of audio.

77. A teach pendant, as set forth in claim 54, wherein the web browser is to display a user interface for interaction with a user.

78. A teach pendant, as set forth in claim 77, wherein the user interface invokes an application.

79. A teach pendant, as set forth in claim 78, wherein the application is part of the display page.

80. A teach pendant, as set forth in claim 78, wherein the application is resident on the teach pendant.

81. A teach pendant, as set forth in claim 78, wherein the application is adapted to request additional display data from the programmable controller in response to a request from the user.

82. A teach pendant, as set forth in claim 78, wherein the application is adapted to request operation of a program on the programmable controller in response to a request by the user.

83. A teach pendant, as set forth in claim 78, wherein the application is adapted to request a transfer of a file between the programmable controller and the teach pendant.

84. A teach pendant, as set forth in claim 78, wherein the application is adapted to request a transfer of a data between the programmable controller, the teach pendant, and a remote computer coupled to the programmable controller.

85. A robotic system for a robot, comprising:
   a programmable controller coupled to the robot; and
   a teach pendant coupled to the programmable controller to control the robot, the teach pendant including:
      a processor for operating the teach pendant;
      a display coupled to the processor; and
      a web browser running on the teach pendant for accepting input data in a standard format and for displaying the input data on the display.

86. A robotic system, as set forth in claim 85, wherein the teach pendant is adapted to teach points in a path of the robot.

87. A robotic system, as set forth in claim 85, wherein the robotic control system is adapted to act as a server.

88. A robotic system, as set forth in claim 87, is adapted to act as a client in communication with the server and is adapted to display a display page.

89. A robotic system, as set forth in claim 88, wherein the server is adapted to compose the display page in response to a request for data from the client and to transmit the display page to the client.

90. A robotic system, as set forth in claim 89, wherein the display page is composed of data and instructions on how to display the requested data.

91. A robotic system, as set forth in claim 90, wherein the display page invokes an application.

92. A robotic system, as set forth in claim 91, wherein the application is adapted to request additional display data from the programmable controller.

93. A robotic system, as set forth in claim 92, wherein the additional display data represents a visual image.

94. A robotic system, as set forth in claim 93, wherein the visual image is a series of images representing a real-time operation of the programmable controller.

95. A robotic system, as set forth in claim 92, wherein the additional display data represents audio information.

96. A robotic system, as set forth in claim 85, wherein the web browser is adapted to display a user interface.

97. A robotic system, as set forth in claim 96, wherein the user interface invokes an application.

98. A robotic system, as set forth in claim 97, wherein the application is adapted to request additional display data from the programmable controller in response to a request from a user.

99. A robotic system, as set forth in claim 97, wherein the application is adapted to request operation of a program on the programmable controller in response to a request by a user.

100. A robotic system, as set forth in claim 97, wherein the application is adapted to request a transfer of a data file between the programmable controller and the teach pendant.

101. A robotic system, as set forth in claim 97, wherein the application is adapted to request a transfer of a data between the programmable controller, the teach pendant, and a remote computer coupled to the programmable controller.

102. A robotic system, as set forth in claim 96, including:
a second programmable controller; and,
a network coupled between the programmable controller and the second programmable controller and being adapted to facilitate communication between the programmable controllers.

103. A robotic system, as set forth in claim 102, wherein the teach pendant is adapted to accept remote input data from the second programmable controller and display the remote input data on the display.

\* \* \* \* \*